INVENTOR.
GEORGE R. ALLEN

INVENTOR.
GEORGE R. ALLEN
BY
his ATTORNEYS

3,021,870
TOP VALVE FOR A PRESSURE VESSEL
George R. Allen, 21 Woodland Drive, Pittsburgh, Pa.
Filed Oct. 14, 1959, Ser. No. 846,494
5 Claims. (Cl. 137—625.12)

This invention relates to valves, and more particularly to a valve for the upper end of a pressure vessel containing liquefied gas and vapor under pressure.

In withdrawing fluid from a pressure vessel or tank containing both liquefied gas and vapor under pressure, it sometimes is desirable to withdraw the gas or vapor and at other times to withdraw the liquid. Until now it has been customary to do this by means of an ordinary valve mounted in the top of the tank. To withdraw gas or vapor, the valve is simply opened, but to withdraw the liquid it has been necessary to invert the tank so that the valve will be at the bottom to permit the liquid to run out. Inverting the tank often is inconvenient to do, and it also is difficult to support the tank with the valve beneath it.

It is among the objects of this invention to provide a pressure vessel valve, which is always used at the top of the vessel, and which permits either vapor or liquid to be withdrawn as desired.

In accordance with this invention, the valve has a body that is screwed into the top of a pressure vessel and is provided with an inlet passage extending upward from its lower end. The upper end of the passage forms an upwardly facing valve seat. The body also has an outlet above the passage but connected with it. A valve closure normally engages the seat, and means are provided for raising the closure to open the valve. The side wall of the inlet passage has a vapor inlet port at one level and a liquid inlet port at another level, and the valve body has bores connecting the two ports with its lower end. A tube extends downward from the liquid inlet bore to a point near the bottom of the pressure vessel. Inside the inlet passage there is a slide valve that engages the side wall of the passage and that is connected with the closure above it for vertical movement thereby as the closure is moved from its seat to a wide open position or to an intermediate position. The slide valve is formed to connect the vapor inlet port with the outlet when the closure is in one of the two open positions just mentioned, and to seal off the vapor inlet port from the outlet and connect the liquid inlet port with the outlet when the closure is in the other one of the open positions. Consequently, vapor will escape through the valve body when the vapor inlet port is connected with the outlet, and liquid will flow out of the valve when the vapor inlet port is sealed off from the outlet and the liquid inlet port is connected with the outlet.

The invention is illustrated in the accompanying drawings, in which—

Figures 1, 2, 3, 4:
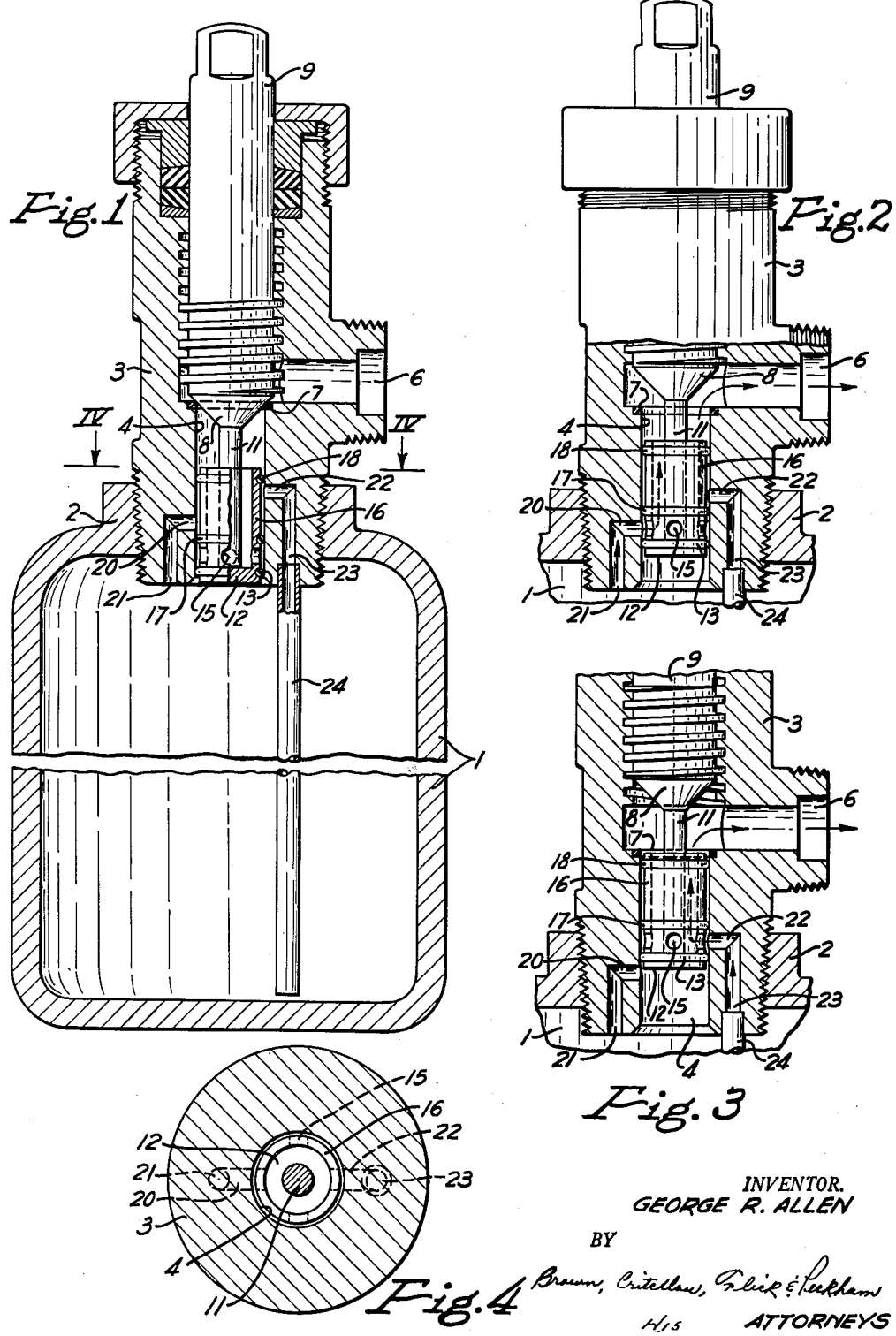
FIG. 1 is a vertical section of one form of my valve mounted on a pressure vessel.
FIG. 2 is a side view of the valve, partly broken away in vertical section and showing the vapor inlet port connected with the valve outlet.
FIG. 3 is a fragmentary vertical section of the valve showing the liquid inlet port connected with the outlet.
FIG. 4 is a horizontal section of the valve taken on the line IV—IV of FIG. 1.

Referring to FIG. 1 of the drawings, a pressure tank or cylinder 1 of well-known construction is provided at its upper end with an internally threaded neck 2, into which the lower portion of a valve is screwed. The body 3 of the valve has a passage 4 extending upward from its lower end to form an inlet for the valve. The valve body above the passage is hollow and has a lateral outlet opening 6, to which a pipe or hose can be connected. The upper end of the inlet passage is encircled by an upwardly facing valve seat 7 that normally is engaged by a downwardly tapered valve closure 8, which has a stem 9 extending up through the upper end of the valve body. The stem may be raised or lowered in any conventional manner. For example, it may be a threaded stem, in which case its projecting upper end is formed for receiving a knob or handle (not shown) for rotating the stem in order to seat or unseat the valve closure.

Supported by the valve closure inside inlet passage 4 is a slide valve, which engages the side wall of the passage. The slide valve includes a vertical stem 11 that extends from the center of the closure down near the lower end of the inlet passage. The diameter of the stem is materially smaller than that of the surrounding passage so that there can be free flow of fluid around it through the passage while the valve is open. The lower end of the stem is secured to the center of a passage-sealing member, which is in sliding sealing engagement with the side wall of the passage. This member may consist of a solid disc 12 encircled by a sealing ring 13. Extending upward from the sealing member, to which it is joined and may form an integral part, is a hollow sleeve element. The lower portion of the sleeve element is spaced from the wall of the passage and is perforated by radial openings 15. The portion of the sleeve element above its perforated portion has sliding sealing engagement with the wall of the passage. The sleeve element may be either a sleeve, some of which engages the wall of the passage, or a sleeve 16 spaced from the wall but encircled directly above its radial openings 15 and also near its upper end by sealing rings 17 and 18 that engage the wall of the passage.

The valve is closed by merely screwing closure 8 down onto its seat, as shown in FIG. 1. At this time the perforated portion of the slide valve between the two lower sealing rings is located below a vapor inlet port 20 in the side wall of inlet passage 4. This port is connected by a suitable bore 21 with the lower end of the valve body. The upper sealing ring 18 of the slide valve is located above a liquid inlet port 22 in the side wall of the inlet passage above the level of the other inlet port. The upper port is connected by a bore 23 with the lower end of the valve body and the upper end of a tube 24 supported by the body and extending down into the pressure vessel to substantially the bottom of the cylinder.

When the closure 8 is raised off its seat to what will be called an intermediate position, as shown in FIG. 2, the closure pulls the slide valve upward so that its perforated lower portion will register with vapor inlet port 20. Vapor will then flow out of that port and into the slide valve and then out of the top of it and the inlet passage to the outlet 6 of the valve. At this time the liquid inlet bore is sealed off by the upper portion of the slide valve, although even without such sealing off the liquid would not leave the vessel because there would be no pressure to force it up through tube 24. When the closure is raised to its wide open position shown in FIG. 3, the perforated lower portion of the slide valve is brought into registry with the liquid inlet port 22, and simultaneously the lower end or sealing member 12—13 of the slide valve is raised above the vapor inlet port to shut off flow of vapor from the cylinder. Thereupon, the pressure of the compressed vapor in the cylinder forces liquid up through the dip tube and the slide valve and out of valve outlet 6.

It will be obvious that the dip tube 24 could be connected to the other bore, in which case liquid would escape from the cylinder when the closure is in the intermediate position of FIG. 2, and vapor would flow out of the cylinder when the closure is wide open as in FIG. 3. Generally, however, it is desirable to use the arrangement shown, because that allows vapor to escape before liquid and in many cases the user may not want to use liquid.

It will be seen that with this valve the operator may withdraw either vapor or liquid from the cylinder at his option and without changing the position of the cylinder, as has been necessary heretofore. All operations of the valve are controlled from above, by merely turning the valve stem to raise or lower the valve closure and the slide valve.

Figure 5:
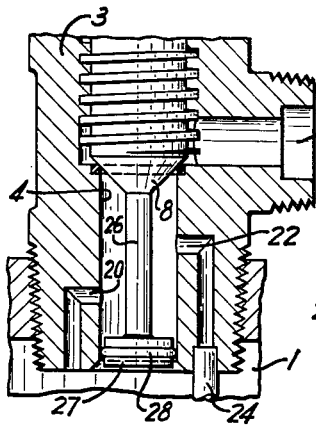
FIGS. 5, 6 and 7 are fragmentary vertical sections of a modified valve.
Figure 6:
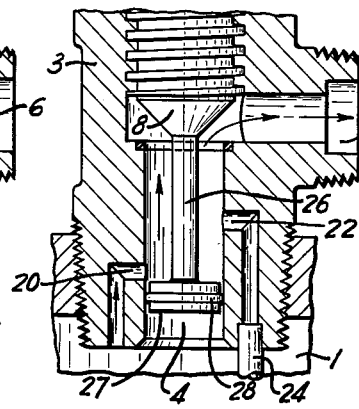
Figure 7:
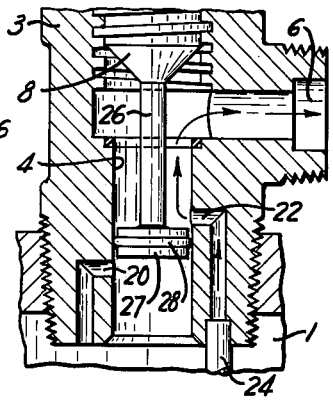

A simpler embodiment of the invention is illustrated in FIGS. 5, 6 and 7, in which the slide valve consists of only a stem 26 connected at its upper end to closure 8 and at its lower end to a passage-sealing member formed from a disc 27 that may slidably engage the side wall of the valve inlet passage 4 in body 3 or may be spaced therefrom and encircled by a sealing ring 28 as shown. As in the first embodiment of this invention, the sealing member is located below the vapor inlet port 20 while the valve is closed and also while the closure is in its intermediate position shown in FIG. 6. It will be seen in FIG. 6 that vapor will enter the valve passage from the vapor inlet port above the sealing member and escape through the valve outlet 6. Although nothing closes off the liquid inlet port 22, such a closing is unnecessary because there is insufficient pressure in pressure cylinder 1 to force out the liquid. When the closure is raised to its upper position shown in FIG. 7, the lower part of the slide valve is raised to a point between the two inlet ports. This shuts off the vapor inlet port so that vapor pressure will build up in the cylinder and force liquid up through tube 24 and out of the liquid inlet port 22, from which it will flow up through valve inlet passage 4 and out of the valve.

Figure 8:
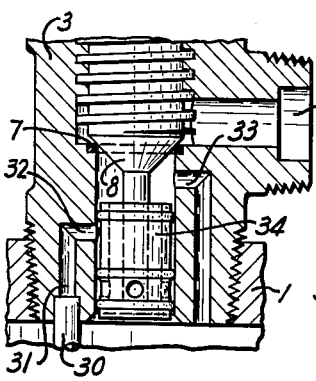
FIGS. 8, 9 and 10 are fragmentary vertical sections of a further modification of the valve.
Figure 9:
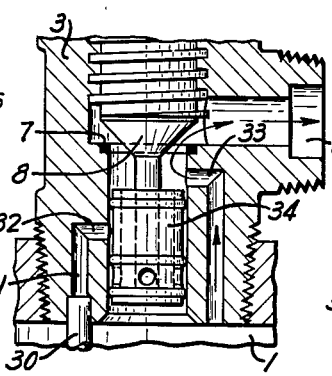
Figure 10:
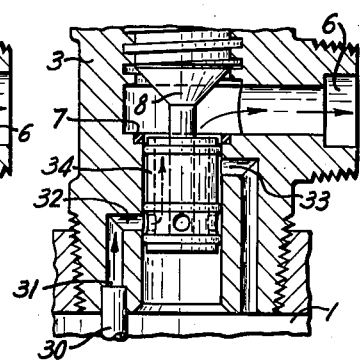

In the embodiment of the invention shown in FIGS. 8, 9 and 10, a slide valve of substantially the same construction as the one shown in FIG. 1 is disclosed. However, the dip tube 30 is connected to the bore 31 connecting the lower end of valve body 3 with the lower inlet port 32, whereby the upper port 33 serves as the vapor inlet port. Also, when the closure 8 is on its seat 7, the upper end of the slide valve sleeve 34 is below the upper inlet port far enough to prevent it from shutting off that port when the closure is raised to its intermediate position shown in FIG. 9. Therefore, gas can escape through the upper port and flow out of the valve outlet 6. When the closure is raised to its upper position shown in FIG. 10, the slide valve is pulled up far enough to seal off the vapor inlet port. At the same time, the perforated lower portion of the slide valve sleeve is brought into registry with the lower inlet port, whereupon the compressed vapor in the upper part of cylinder 1 will force liquid up through tube 30 and the slide valve and out of the main valve outlet.

In view of this disclosure, other modifications will occur to those skilled in the art.

According to the provisions of the patent statutes, I have explained the principle of my invention and have illustrated and described what I now consider to represent its best embodiment. However, I desire to have it understood, that within the scope of the appended claims, the invention may be practiced otherwise than as specifically illustrated and described.

I claim:

1. A top valve for a pressure vessel containing liquefied gas and vapor under pressure, the valve comprising a body provided with an inlet passage extending upward from its lower end, the upper end of the passage forming an upwardly facing seat, said body having an outlet above said passage and connecting with it, a vertically movable valve closure normally engaging said seat, means for raising the closure away from its seat, the side wall of said passage having a vapor inlet port at one level and a liquid inlet port at another level, said body having bores connecting said ports with its lower end, a tube depending from the liquid inlet bore and extending downward below said body and having an open lower end to locate the liquid inlet at a lower level than the vapor inlet, and a slide valve in said passage engaging its side wall and connected with said closure for vertical movement thereby as the closure is moved from its seat to a wide open position or an intermediate position, the slide valve including a passage-sealing member at its lower end disposed below said inlet ports while the closure is on its seat and in its intermediate position, said sealing member being disposed between said inlet ports when the closure is raised to wide open position, and the slide valve being formed to connect the lower inlet port with said outlet when the closure is in its intermediate position and to connect only the upper inlet port with said outlet when the closure is wide open.

2. A top valve according to claim 1, in which the slide valve seals off said upper inlet port from said outlet while the closure is in its intermediate position.

3. A top valve for a pressure vessel containing liquefied gas and vapor under pressure, the valve comprising a body provided with an inlet passage extending upward from its lower end, the upper end of the passage forming an upwardly facing seat, said body having an outlet above said passage and connecting with it, a vertically movable valve closure normally engaging said seat, means for raising the closure away from its seat, the side wall of said passage having a vapor inlet port at one level and a liquid inlet port at another level, said body having bores connecting said ports with its lower end, a tube depending from the liquid inlet bore and extending downward below said body, and a slide valve in said passage engaging its side wall and connected with said closure for vertical movement thereby as the closure is moved from its seat to a wide open position or an intermediate position, the slide valve including a passage-sealing member, a hollow sleeve element joined to said member and extending upward therefrom with its lower portion spaced from the wall of said passage and provided with an opening into the element, the portion of said sleeve element above said lower portion having sliding sealing engagement with said wall, and means connecting said sealing member and sleeve element with said closure, said lower portion of the sleeve element registering with the lower inlet port when said closure is in its intermediate position, and said lower portion registering with the upper inlet port when the closure is in its wide open position.

4. A top valve for a pressure vessel containing liquefied gas and vapor under pressure, the valve comprising a body provided with an inlet passage extending upward from its lower end, the upper end of the passage forming an upwardly facing seat, said body having an outlet above said passage and connecting with it, a vertically movable valve closure normally engaging said seat, means for raising the closure away from its seat, the side wall of said passage having a vapor inlet port at one level and a liquid inlet port at another level, said body having bores connecting said ports with its lower end, a tube depending from the liquid inlet bore and extending downward below said body, and a slide valve in said passage engaging its side wall and connected with said closure for vertical movement thereby as the closure is moved from its seat to a wide open position or an intermediate position, the slide valve including a passage-sealing member, a hollow sleeve element joined to said member and extending upward therefrom with its lower portion spaced from the wall of said passage and provided with an opening into the element, the portion of said sleeve element above said lower portion having sliding sealing engagement with said wall, and means connecting said sealing member and sleeve element with said closure, said sleeve element having its upper end below the upper inlet port and said lower portion below both ports when said closure is in its intermediate position, and the upper end of the sleeve element being disposed above the upper inlet port and said lower portion being disposed in registration with the lower inlet port when the closure is in its wide open position.

5. A top valve for a pressure vessel containing liquefied gas and vapor under pressure, the valve comprising a body provided with a passage extending upward from its lower end, the upper end of the passage forming an upwardly facing seat, said body having an outlet above said passage and connecting with it, a vertically movable valve closure normally engaging said seat to close the valve, means for raising the closure away from its seat, the side wall of said passage having a vapor inlet port at one level and a liquid inlet port at a higher level, said body having bores connecting said ports with its lower end, a tube depending from the liquid inlet bore and extending downward below said body and having an open lower end to locate the liquid inlet at a lower level than the vapor inlet, a valve disc member normally in the lower end of said passage slidingly engaging its side wall in sealing relation therewith, and a solid valve stem in said passage connecting said disc member with said valve closure for vertical movement thereby as the closure is moved from its seat to a wide open position or an intermediate position, said stem positioning the valve disc member below both inlet ports while the closure is on its seat and in its intermediate position and raising the disc member to a location between the ports when the closure is raised to wide open position, whereby the lower inlet port will be connected with said outlet when the closure is in its intermediate position, and only the upper inlet port will be connected with said outlet when the closure is in wide open position.

References Cited in the file of this patent

UNITED STATES PATENTS

| | | |
|---|---|---|
| 1,231,733 | Haley | July 3, 1917 |
| 1,502,483 | O'Flaherty | July 22, 1924 |
| 2,365,423 | MacSporran | Dec. 19, 1944 |
| 2,714,388 | Malthaner | Aug. 2, 1955 |
| 2,851,057 | Fraser | Sept. 9, 1958 |